(12) United States Patent
Lin et al.

(10) Patent No.: US 7,072,151 B2
(45) Date of Patent: Jul. 4, 2006

(54) MAGNETIC ASSIST READ TRACK-WIDTH DEFINITION FOR A LEAD OVERLAY TOP SPIN-VALVE GMR HEAD

(75) Inventors: Charles C. Lin, San Jose, CA (US); Cheng T. Horng, San Jose, CA (US); Min Li, Fremont, CA (US); Kochan Ju, Fremont, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 10/782,671

(22) Filed: Feb. 19, 2004

(65) Prior Publication Data

US 2004/0160709 A1    Aug. 19, 2004

Related U.S. Application Data

(60) Division of application No. 09/953,542, filed on Sep. 17, 2001, now Pat. No. 6,729,014, which is a continuation of application No. 09/933,963, filed on Aug. 22, 2001, now Pat. No. 6,721,143, which is a continuation of application No. 09/839,960, filed on Apr. 23, 2001, now Pat. No. 6,614,630.

(51) Int. Cl.
G11B 5/33    (2006.01)

(52) U.S. Cl. ....................................... 360/322
(58) Field of Classification Search ................. 360/322, 360/324.1, 324.11, 324.12
See application file for complete search history.

(56) References Cited

U.S. PATENT DOCUMENTS

| | | | |
|---|---|---|---|
| 5,705,973 A | 1/1998 | Yuan et al. | 338/32 R |
| 5,828,530 A | 10/1998 | Gill et al. | 360/113 |
| 5,869,963 A | 2/1999 | Saito et al. | 324/252 |
| 5,923,505 A * | 7/1999 | Kroes et al. | 360/327.22 |
| 5,936,810 A * | 8/1999 | Nakamoto et al. | 360/324.1 |
| 6,201,669 B1 | 3/2001 | Kakihara | 360/313 |
| 6,262,869 B1 * | 7/2001 | Lin et al. | 360/324.11 |
| 6,538,856 B1 * | 3/2003 | Gill | 360/319 |

\* cited by examiner

Primary Examiner—A. J. Heinz
Assistant Examiner—Mark Blouin
(74) Attorney, Agent, or Firm—Saile Ackerman LLC; Stephen B. Ackerman

(57) ABSTRACT

A method for forming a top spin-valve SyAP GMR read sensor having a novel conductive lead overlay configuration and the sensor so formed. The lead overlay electrically contacts the sensor at a position within the SyAP pinned layer, thus simultaneously assuring improved electrical contact and destroying the GMR properties of the sensor at the junction to improve the definition of the sensor track width.

3 Claims, 2 Drawing Sheets

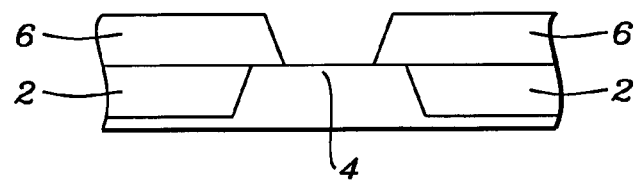
FIG. 1 – Prior Art
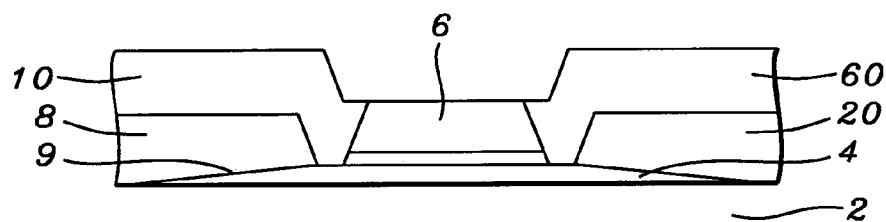
FIG. 2
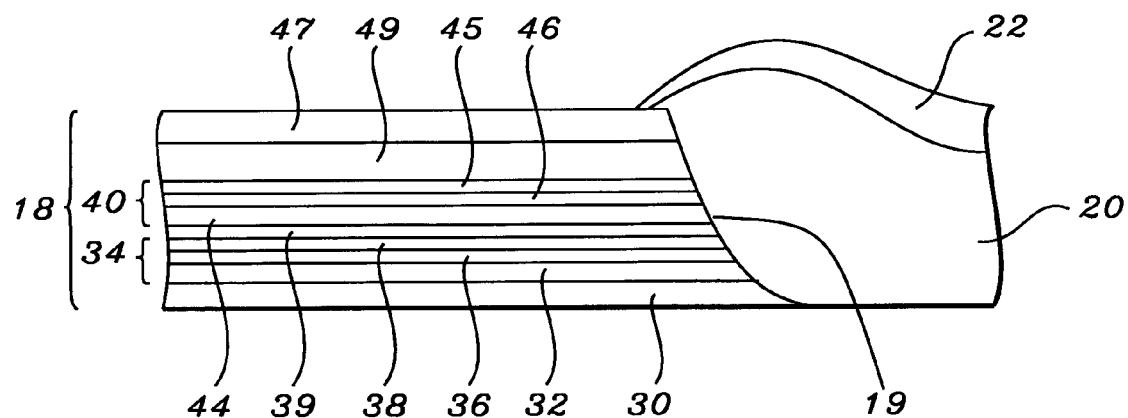
FIG. 3a

MAGNETIC ASSIST READ TRACK-WIDTH DEFINITION FOR A LEAD OVERLAY TOP SPIN-VALVE GMR HEAD

This is a division of patent application Ser. No. 09/953,542, filing date Sep. 17, 2001 now U.S. Pat. No. 6,729,014, Magnetic Assist Read Track-Width Definition For A Lead Overlay Top Spin-Valve Gmr Head, which is a continuation of Ser. No. 9/933,963 filed Aug. 22, 2001 now U.S. Pat. No. 6,721,143, which is of Ser. No. 9,839,960 filed Apr. 23, 2001, now U.S. Pat. No. 6,614,630 assigned to the same assignee as the present invention.

RELATED PATENT APPLICATION

This application is related to Ser. No. 09/933,963, filing date Aug. 22, 2001 and to Ser. No. 09/839,960 filing Apr. 23, 2001, assigned to the same assignee as the current invention.

BACKGROUND OF THE INVENTION

1. Field of the Invention

This invention relates generally to the fabrication of a giant magnetoresistive (GMR) read head and more particularly to the fabrication of a top spin-valve GMR read head having a novel conducting lead overlay (LOL) design.

2. Description of the Related Art

The spin-valve GMR read head configuration has become commonplace in the prior art. Top spin valves, bottom spin valves and dual spin valves are but some of the variations to be found. In its most essential form, a spin valve consists of two magnetized layers, typically layers of ferromagnetic material, separated by a non-magnetic spacer layer, usually formed of copper. One of the magnetized layers, the "pinned" layer, has its magnetic moment fixed in space, while the other magnetized layer, the "free" layer, has a magnetic moment that is free to move in response to the magnetic fields of external storage media. The angle between the free and pinned magnetizations produces variations in the resistance of the spin valve as a result of there being unequal scattering cross-sections for spin up and spin down conduction electrons. It is these resistance variations that are used to "read" the stored information. The pinned layer has its magnetic moment pinned by a "pinning" layer, which is typically a layer of antiferromagnetic material that is formed in direct contact with the pinned layer. The "bottom" spin valve has its pinned layer at the bottom of the configuration (the pinning layer is nearest the substrate), whereas the "top" spin valve has its pinned layer at the top of the configuration (the pinning layer essentially caps the configuration). Two other material layers are typically formed, one over the other, to either side of the configuration: a current lead layer and a longitudinal magnetic bias layer. The current leads provide a sensing current, which produces voltage variations across the spin valve as a result of the resistance variations. The longitudinal magnetic bias layers stabilize the domain structure of the free layer, making it less sensitive to external noise. FIG. 1 shows a very schematic sketch of a prior art spin valve sensor (either top or bottom type) with conducting leads and longitudinal biasing layers in place. In this particular depiction, the bias layers (2) contact steeply sloping sides of the sensor element (4) to form what is termed a "contiguous junction," while the conducting leads (6) overlay both the bias layers and the top of the sensor element to form a "lead overlaid" (LOL) design.

A more recent variation on both the top and bottom spin valve configuration is the use of a synthetic antiferromagnetic pinned (SyAP) layer in place of the single ferromagnetic pinned layer. The synthetic layer is, typically, a three layer lamination comprising two ferromagnetic layers separated by a thin non-magnetic coupling layer, typically a ruthenium layer. The two ferromagnetic layers are magnetized in mutually antiparallel directions and held that way by antiferromagnetic exchange coupling across the non-magnetic coupling layer in combination with an antiferromagnetic pinning layer formed on the SyAP. For descriptive purposes, the two ferromagnetic layers will be designated AP1 and AP2, where AP1 is the layer nearest the free layer (typically formed on the copper layer that separates the free and pinned layers.) The SyAP has many advantages over the single ferromagnetic pinned layer, which are not germane to this discussion. The increasing use of the SyAP, however, is of importance, since the present invention will advantageously affect the operation of a SyAP top spin valve element.

For an LOL to function, the lead resistance must be much smaller than that of the GMR stack. In addition, the LOL design must satisfy at least the following three criteria if the sensor is to operate in a maximally advantageous fashion. First, there must be good electrical contact between the LOL and the main portion of the sensor element, i.e. the [free/Cu/AP1] portion of the sensor. This will insure adequate current through the active region of the sensor and strong voltage variations that are easily sensed. Second, the LOL region of the sensor should have a low GMR ratio (the ratio of resistance variation to resistance, dR/R). It is desirable to have the active width of the sensor (the region that reads the narrow tracks of the storage medium) sharply defined in terms of maximum GMR ratio. If the lead region has a low GMR ratio, it enhances the definition of the width. Additionally, if the region of the sensor contacted by the leads also has a high GMR ratio, it will contribute to undesirable side reading of recorded tracks not being accessed. Third, the act of fabricating the lead layer must not damage the free layer. In other words, the process of contiguous junction formation and lead layer deposition must not damage the free layer in the region of the junction and the overlay.

Kakihara (U.S. Pat. No. 6,201,669) provides a spin-valve type read element in which the lead layers are formed both beneath and on the sides of the element. The lead layer formation so provided allows the upper surface of the read head to be flatter.

Saito et al. (U.S. Pat. No. 5,869,963) provides a spin valve sensor formed of multiple spin valve laminates and using PtMn as the antiferromagnetic layer which allows lower annealing temperatures. The longitudinal bias layers and the conductive lead layers are still formed basically in accord with the contiguous junction and lead overlay configuration discussed above and illustrated in FIG. 1 herein.

Yuan et al. (U.S. Pat. No. 5,705,973) provides a dual spin valve formation with improved biasing of the free layer by forming pinned layers both above and below it. The longitudinal biasing and lead formation follow the standard contiguous junction process, wherein the junction shape is produced by ion-milling, with the milling process halted at the antiferromagnetic layer beneath the spin valve formation.

Gill et al. (U.S. Pat. No. 5,828,530) provides a spin valve sensor antisymmetrically located between upper and lower shield layers so that image currents in said shield layers cancel the effects of fields produced by the sense current within the sensor, which latter fields have the undesirable effect of stiffening the magnetic moment of the free layer. The resulting formation has an unusual disposition of its conducting leads, wherein one lead is beneath the spin valve and another is above it. The longitudinal bias layers are still disposed to either side of the spin valve.

None of the prior art structures address the three criteria of advantageous LOL formation: 1) good electrical contact, 2) low GMR ratio in overlay region and 3) non-damaging lead formation. Neither do any of these structures provide an SyAP spin valve, which is a highly advantageous design of wide recent use. It is to precisely the meeting of these three criteria, particularly as they apply to an SyAP design, that the present invention is directed.

SUMMARY OF THE INVENTION

A first object of this invention is to provide a method for forming a top spin-valve read head layer having improved electrical contact between the conducting lead layers and the body of the sensor element.

It is a second object of the present invention to provide a method for forming a top spin-valve read head having an improved track-width definition.

It is a third object of the present invention to provide a method for forming a top spin-valve read head that maintains the integrity of the free magnetic layer and doesn't damage it during fabrication.

It is a fourth object of the present invention to provide a method for forming a top spin-valve read head having thinner conductive lead layers, thereby allow greater flexibility in improving lead topography.

It is a fifth object of the present invention to provide a method for forming a top spin-valve read head having its GMR ratio significantly diminished beneath the contact junction, thereby suppressing side reading and improving track width definition.

It is a sixth object of the present invention to provide a method for forming a top spin-valve read head having an improved magnetoresistance to conductor resistance ratio.

It is a seventh object of the present invention to provide a method for forming a top spin-valve read head having a large conductor cross-section to carry the bias current and not to cause electro-migration of the lead conductor.

It is an eighth object of the present invention to provide a top spin-valve read head satisfying the objects so stated.

In accord with the objects of this invention there is provided a method for forming a top spin-valve read head having an SyAP layer of [AP1/Ru/AP2] form in which the electrical contact of the conductive lead overlay is between the [AP2/Ru] interface within the SyAP layer and the [free layer/Cu]interface that is formed on the SyAP layer. Not only does this method of contact formation improve the electrical contact, but the formation of the overlay at this position essentially destroys the SyAP properties there, considerably reducing or eliminating the GMR properties of the sensor at the junction and, thereby, providing a magnetic assist to the track-width definition. Further, since the shape of the junction region is produced by ion-beam etching (IBE), the top spin-valve configuration is advantageous because it allows improved process control during the etching process. This control is implemented by the formation of an extra-thick Ta capping layer on the longitudinal bias layer which serves as an ion-milling mask for defining the overlay junction. This, in turn, permits the formation of a cleaner interface between the LOL and the sensor body. There is also provided the spin valve structure so formed by the method of the present invention.

BRIEF DESCRIPTION OF THE DRAWINGS

The objects, features and advantages of the present invention are understood within the context of the Description of the Preferred Embodiments, as set forth below. The Description of the Preferred Embodiments is understood within the context of the accompanying figures, wherein:

FIG. 1 is a schematic cross-sectional view of a prior art spin valve with a contiguous junction and LOL.

FIG. 2 is a schematic cross-sectional view of the spin valve of the present invention.

FIGS. 3a–3c are schematic views of the structure and process of forming the structure, of the present invention as applied to the formation of a contiguous junction and LOL structure on a SyAP top spin-valve element.

DESCRIPTION OF THE PREFERRED EMBODIMENT

Figure 3B:
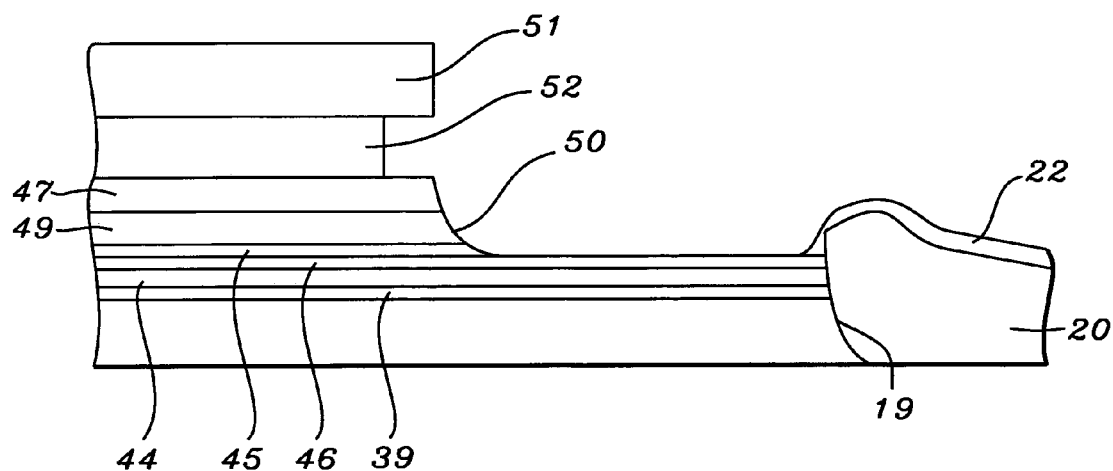

A preferred embodiment of the present invention provides a top spin-valve with SyAP layer, a novel contiguous junction longitudinal magnetic bias layer and a novel lead overlay structure and a method for its formation.

Referring to FIG. 2, there is shown a schematic diagram of a cross-section in a plane parallel to the air bearing surface of the top-spin valve read element formed in accordance with the method of the present invention. More details of the formation of the lead overlay configuration will be given in FIGS. 3a–c below.

As can be seen in FIG. 2, there is formed on a substrate and dielectric layer (2), which could be a lower shield for the element, a top spin-valve sensor stack configuration of the following form:

Seed/Free/Cu/AP1/Ru/AP2/AFM/Cap which has been shaped by ion-beam etching into a lower portion (4), comprising the Seed/Free/Cu layers of the configuration and an upper portion (6), comprising the AP1/Ru/AP2/AFM/Cap portion. Here, the seed layer can be a layer of NiCr or NiFeCr formed on the dielectric layer (2), which is normally $Al_2O_3$. The "Free" designation above refers to a ferromagnetic layer whose magnetic moment is free to rotate in response to external fields. In the method of the present invention, the free layer is a double layer of NiFe/CoFe. The Cu layer is a metallic, non-magnetic layer that separates the free layer from the SyAP layer. The SyAP layer (the pinned layer) is a three-layer laminate comprising two ferromagnetic layers magnetized in mutually antiparallel directions (AP11 and AP2), separated by a thin non-magnetic coupling layer of ruthenium (although other coupling materials are permissable). The antiferromagnetic pinning layer is denoted AFM and it is typically a layer of antiferromagnetic material such as MnPt. The entire fabrication is covered by a protective capping layer, denoted "Cap." As can be seen in the figure, a domain-stabilizing longitudinal bias layer (8) contacts both sides of (4) in a contiguous junction region (9). A conductive lead overlay layer (10) is formed over the bias layer and contacts the sides of both (4) and (6), making good electrical contact with the Free/Cu/AP 1 region.

Figure 3C:
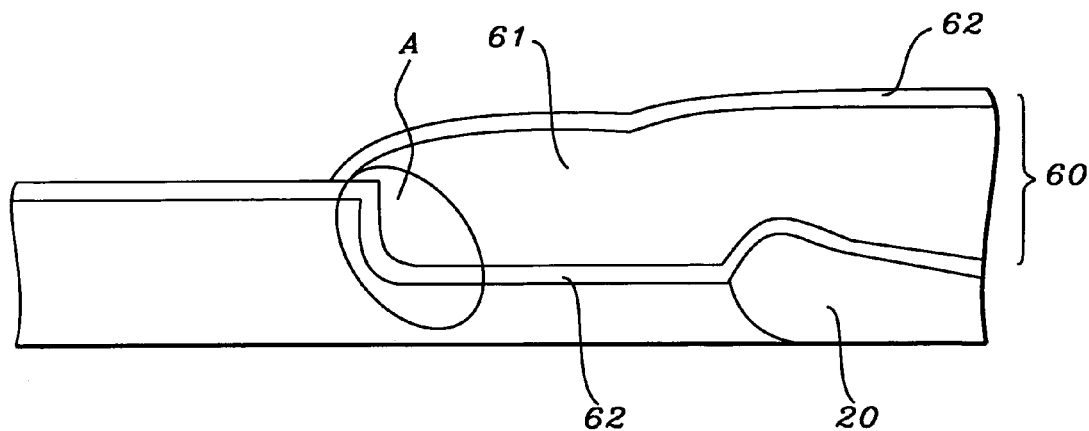

Referring next to FIGS. 3a–3c, there is shown the detailed process by which the novel current lead overlay is formed. FIG. 3a is a schematic depiction of the cross-section of the top spin-valve sensor stack configuration (18) whose sides (19) (only one side is shown) have already been shaped for the formation of a contiguous junction with a longitudinal magnetic bias layer (20) of "hard" magnetic material (magnetic material having high coercivity, such as CoCrPtTa, CoNiPt, CoCrPt and CoCrTa) typically formed over a magnetic property-enhancing seed layer. In this preferred embodiment, the seed layer is a composite of Ta/TiCr of total thickness approximately 100 A, but which could be between approximately 80 A and 120 A and the hard bias material is a layer of CoCrPt of approximately 350 A thickness, but which could be of thickness between approximately 200 A to 500 A. The shaping of the sides (19) and deposition of the bias layer (20) is done by methods well known in the art, such as the dual use of a lift-off stencil, first as an IBE etching mask and subsequently as a bias-layer deposition mask.

The hard bias layer is then capped by a protective material layer (22), which is a Ta layer formed to a thickness of between approximately 100 and 120 angstroms. The Ta layer will serve as a hard mask to protect the hard bias layer during a subsequent ion-beam etching (IBE) process to form the lead overlay junction. The layers comprising the stack (18) are a magnetoresistive-property-enhancing seed layer (30), formed of NiCr or NiFeCr to a thickness of between approximately 30 A (angstroms) and 100 A, on which is formed a metallic, non-magnetic bilayer of Ru/Cu (32), formed to a thickness of between approximately 3 A and 15 A, on which is formed a ferromagnetic free layer (34), which is a bilayer comprising a layer of NiFe (36) of thickness between approximately 10 A and 80 A, on which is formed a layer of CoFe (38) of thickness between approximately 5 A and 40 A. A non-magnetic spacer layer (39), which in this preferred embodiment is a layer of Cu of approximately 19 angstroms thickness but which could be formed to a thickness of between approximately 15 A and 30 A is formed on the free layer and a SyAP layer (40), comprising two layers of ferromagnetic material separated by a non-magnetic coupling layer, is formed on the Cu layer. The ferromagnetic layers AP11 (44) and AP2 (45) comprising the SyAP (pinned) layer, are layers of CoFe formed to an approximate thickness of 15 angstroms in this preferred embodiment, but they can be layers of the ferromagnetic material CoFe or NiFe, formed to thicknesses between approximately 10 A and 25 A. The AP1, AP2 designations refer to the proximity of the layers to the pinning and free layers. AP 1 is nearer to the free layer (34), AP2, to the pinning layer (indicated below as (49)). The coupling layer (46) is a layer of Ru or other material that permits antiferromagnetic exchange coupling between the ferromagnetic layers, and it is formed to a thickness of approximately 7.5 angstroms in this preferred embodiment, but could have a thickness range of between approximately 6 A and 9 A. An antiferromagnetic pinning layer (49), which in this embodiment is a layer of MnPt formed to a thickness of approximately 120 angstroms, but which could be other antiferromagnetic material formed to a thickness of between approximately 50 A and 200 A. An upper capping layer (47), which is a layer of NiCr or Ta formed to a thickness of between approximately 20 and 40 A is formed on the antiferromagnetic layer.

Referring next to FIG. 3b, there is shown the fabrication of FIG. 3a subsequent to an ion-beam etching process (IBE) to prepare a junction surface (50) for the conductive lead overlay (LOL). A photoresist layer (51) on an undercut PMGI pedestal (52) serves a dual purpose in this process; it is an IBE mask for the etching and a lift-off stencil for the subsequent LOL deposition. The mask is formed to a width of between approximately 0.1–0.3 microns to define a desirable trackwidth. The etching (or milling) process is most advantageously applied to produce a milled region that extends down just to the Ru coupling layer in the SyAP formation (46), although a depth somewhere between the AP1 (44) and AP2 (45) layers is acceptible and during actual manufacturing, depths reaching the Cu spacer layer will still allow the objects of the invention to be achieved. It is to be noted that the overlay formations of the prior art (see FIG. 1) are typically formed on the upper surface of the GMR element, so that the current must pass through the high resistance capping layer and antiferromagnetic layer; thus it can be appreciated that a significant advantage of the present method is the depth range of the ion-etching process, which allows the conductive lead layer to contact regions of higher conductivity. As is also schematically indicated, it is a further novel aspect of the present invention that the thick capping layer (22) deposited on the longitudinal bias layer also serves as a mask to define the lateral outer edge of the ion-milled region whose inner edge is defined by the photoresist layer (51); the milling process removes an approximately 80 angstrom thick portion of the Ta capping layer (22) covering the longitudinal bias layer (20).

Referring finally to FIG. 3c, there is shown the fabrication of FIG. 3b subsequent to the deposition of the conductive lead overlay (60) and its capping layer (62) and the removal of the lift-off stencil ((51) and (52) of FIG. 3b). The conductive lead overlay is a layer of Ta/Au/Ta formed by ion-beam deposition, wherein the Au layer (61) is formed to a thickness of approximately 300 angstroms, but a range between 100 and 500 A is acceptible, and each of the two Ta layers (62) are formed to a thickness of approximately 50 angstroms, but a range between 20 and 60 A is acceptible. Other conducting materials, including Rh, Ir and Ru can be used to replace the Au in forming the lead layer and the thicknesses of these conducting layers (61) can be with the range of approximately 100 A to 500 A. A circled region "A" in the figure indicates the region of high conductor cross-section which can carry significant sensor currents while not causing electro-migration of the conductor material. The fabrication of FIG. 3c is thereby a schematic representation of the completed top spin-valve sensor element as formed in accord with the method of this invention.

As is understood by a person skilled in the art, the preferred embodiment of the present invention is illustrative of the present invention rather than limiting of the present invention. Revisions and modifications may be made to methods, materials, structures and dimensions employed in the present method of fabricating lead overlay top spin-valve giant nagnetoresistive (GMR) read head configurations and the structures so fabricated, while still providing a method of fabricating lead overlay top spin-valve giant magnetoresistive (GMR) read head configurations and the structures so fabricated, in accord with the spirit and scope of the present invention as defined by the appended claims.

What is claimed is:

1. A top spin-valve giant magnetoresistive (GMR) SyAP read head having a novel conductive lead overlay configuration, comprising:
  a substrate on which is formed a dielectric layer;
  a seed layer formed on said dielectric layer;
  a ferromagnetic free layer formed on the seed layer;
  a metallic, non-magnetic spacer layer formed on the ferromagnetic free layer;
  a synthetic antiferromagnetic pinned layer (SyAP) formed on the spacer layer, said layer further comprising:
    a first ferromagnetic layer, AP1;
    a metallic, non-magnetic coupling layer formed on said first ferromagnetic layer;

a second ferromagnetic layer, AP2, formed on the metallic, non-magnetic coupling layer;

an antiferromagnetic pinning layer formed on said SyAP layer;

a first capping layer formed on said antiferromagnetic pinning layer, forming thereby a layered top spin-valve sensor element; and the opposite lateral edges of said layered configuration being shaped to form a substantially vertical second side region, a substantially vertical first side region distal to said second side region and a horizontal region extending between said first and second side regions, said regions being covered by said first capping layer wherein the first side region extends vertically from a position between said metallic non-magnetic coupling layer and said metallic, non-magnetic spacer layer to the substrate and wherein said second side region extends vertically from the capping layer, through said AP2 layer to a point between said metallic non-magnetic coupling layer and said metallic, non-magnetic spacer layer; and a longitudinal hard magnetic bias layer formed in a contiguous junction against said first side region, said bias layer being covered by a second capping layer;

a conducting lead layer, formed over said longitudinal hard magnetic bias layer said lead layer electrically contacting said horizontal region and said second side region of said sensor element and forming, thereby, a lead overlay configuration.

2. The structure of claim 1 wherein the conducting lead layer is a triple layer comprising a first layer of Ta, formed to a thickness of between approximately 20 and 60 angstroms on which is formed a layer of Au, of thickness between approximately 100 and 500 angstroms, on which is formed a second layer of Ta, to a thickness of between approximately 20 and 60 angstroms.

3. The structure of claim 1 wherein the conducting lead layer is a laminated layer comprising layers of conducting material chosen from the group consisting of Au, Ag, Ta, Rh, Ir, and Ru.

* * * * *